United States Patent [19]

Pezzoli et al.

[11] 4,025,449

[45] May 24, 1977

[54] PROCESS TO PRODUCE BARIUM AND STRONTIUM FERRITE

[75] Inventors: Paul A. Pezzoli; Stanley F. Spangenberg, both of Midland, Mich.

[73] Assignee: The Dow Chemical Company, Midland, Mich.

[22] Filed: Oct. 21, 1975

[21] Appl. No.: 624,363

[52] U.S. Cl. .............................. 252/62.63; 423/594
[51] Int. Cl.² ........................................ C04B 35/26
[58] Field of Search ..................... 252/62.63, 62.64; 423/594

[56] References Cited

UNITED STATES PATENTS

| | | | |
|---|---|---|---|
| 3,596,350 | 8/1971 | Steingrover | 252/62.63 X |
| 3,629,118 | 12/1971 | Isserlis | 252/62.63 X |
| 3,634,254 | 1/1972 | Micheli | 252/62.63 |
| 3,810,973 | 5/1974 | Arendt et al. | 423/594 |
| 3,830,743 | 8/1974 | Schlaudt et al. | 252/62.63 |
| 3,855,374 | 12/1974 | Brailowsky | 252/62.63 X |

FOREIGN PATENTS OR APPLICATIONS

| | | | |
|---|---|---|---|
| 46-3545 | 1/1971 | Japan | 423/59 X |
| 44-17710 | 8/1969 | Japan | 252/62.63 |

*Primary Examiner*—Jack Cooper
*Attorney, Agent, or Firm*—Robert W. Selby

[57] ABSTRACT

A method to produce a magnetic barium or strontium ferrite comprising solubilizing an alkaline earth metal compound in an aqueous solution containing about 20 to about 60 weight percent alkali metal hydroxide. The resulting solution is heated to within the range of about 90° to about 130° C and thereafter admixed with a sufficient amount of a soluble iron compound to form a magnetic precipitate. A crystalline, magnetic ferrite is formed by heating the precipitate to within the range of about 800° to about 1500° C.

17 Claims, No Drawings

PROCESS TO PRODUCE BARIUM AND STRONTIUM FERRITE

BACKGROUND OF THE INVENTION

This invention pertains to magnetic materials and more in particular relates to a method to produce a crystalline magnet.

Magnets of various compositions are well known and have been employed for numerous purposes, such as for direct current motors and for refrigerater closing mechanisms. Ferrites can be produced by methods as described in, for example, Takada et al., Preparation of Ferrites by Wet Method, Ferrites: Proceedings of the International Conference 69 (July 1970) and Sato et al., Preparation and Magnetic Characteristics of Ultra-Fine Spinel Ferrites, Ferrites: Proceedings, of the International Conference 72 (July (1970). An improved method to produce a ferrite magnet is desired.

THE INVENTION

A novel method has been developed to produce a magnetic ferrite material. This method includes admixing an alkaline earth metal compound with a sufficient amount of an aqueous solution containing from about 10 to about 60 weight percent (about 0.1 to about 24 moles per liter) alkali metal hydroxide to form a solution. The solution formed is then heated to within the temperature range of from about 90° to about 130° C and preferably about 110° to about 115° C. A soluble iron compound is added to and admixed with the heated solution to provide an alkaline earth metal compound-alkali hydroxide- iron compound mixture. It has been determined that, to optimize the magnetic properties of the hard ferrite, the iron compound is added to the alkaline earth metal compound-alkali hydroxide solution rather than being added in a different sequence. Preferably a sufficient amount of the iron compound is added to the heated solution to provide an about 0.1:1 to about 5:1 molar ratio of alkali metal hydroxide to the iron compound. More preferably an approximately stoichiometric amount of the iron compound is added to the solution. Even more preferably an excess of the alkali metal hydroxide is employed.

A precipitate forms after the iron compound is added to the solution. This precipitate is removed from the liquid portion by suitable means, for example, filtering, centrifugal methods, decanting and the like. The precipitate is believed to be a magnetic spinel consisting essentially of barium oxide, iron oxide and a minor amount of impurities. This spinel generally has a particle size of from about 0.25 to about 0.4 microns and exhibits a structure which is at least partially amorphous, i.e., without a definite crystalline symmetry.

In a preferred embodiment the alkaline earth compound is a barium or strontium compound, such as $Ba(C_2H_3O_2)_2$, $Sr(C_2H_3O_2)_2$, $Ba(NO_3)_2$, $Sr(NO_3)_2$, $BaF_2$, $SrF_2$, $BaCl_2$, $SrCl_2$, $BaBr_2$, $SrBr_2$, $BaI_2$, $SrI_2$, $BaCO_3$, $SrCO_3$, $Ba(OH)_2$ and $Sr(OH)_2$. More preferably the alkaline earth compound is a barium compound, especially $BaCl_2$.

The alkali hydroxide employed in the present invention can be the hydroxide of sodium, potassium, rubidium or cesium. Generally the hydroxides of potassium and,preferably, sodium are used.

Suitable iron compounds are those which ionize in the alkaline earth compound-alkali hydroxide solution to form an $Fe^{+++}$ cation. Examples of such compounds are $FeCl_3$, $FeBr_3$, $Fe(NO_3)_3$, $Fe_2(SO_4)_3$, $Fe(C_2H_3O_2)_2$, $Fe_2(C_2O_4)_3$ and hydrates thereof. Iron chloride has proven to be especially satisfactory in the present process.

To form a crystalline, hard ferrite with a hexagonal structure, the magnetic precipitate is heated to within the temperature range of from about 800° to about 1500° C and preferably about 1000° to about 1200° C. The crystalline ferrite formed generally has a largest particle dimension within the range of from about 0.25 to about 10 microns. Heating of the precipitate can be carried out by known means without requiring a controlled atmosphere. If desired, an inert atmosphere can be employed; however, the process is generally carried out under standard atmospheric conditions. Suitable means of heating are those well known in the art, for example, gas fired or electric furnaces and the like. Before heating to form the crystalline ferrite, the precipitate can, if desired, be dried at temperatures within the range of from about 20° to about 200° C.

To further enhance the magnetic properties of the hard ferrite produced by the present process a number of well known compounds, known in the art as "dopants", can be admixed with the ferrite. For example, compounds containing As, Sb, P, Te, Ca, Al, Sc, Ti, V, Cr, Mn, Fe, Co, Ni, Cu and Zn ions.

A composite crystalline ferrite body can be readily formed by admixing the precipitate with a suitable binder, such as polyvinyl chloride, stearic acid, water and wax, and then heating this mixture to within the temperature range of from about 800° to about 1500° C and preferably about 1000° to about 1200° C. When a dense compact is desired, the binder-precipitate mixture can be pressure compacted by known means substantially simultaneously with heating. The ferrite within the compact can be magnetically oriented with substantially all of the negative or positive poles in substantially the same direction by exposing the powdered crystalline ferrite to a suitable magnetic field prior to compaction.

The following examples will further illustrate the invention.

EXAMPLE 1

A quantity of 2.44 grams of reagent grade $BaCl_2 \cdot 2H_2O$ was added to 100 milliliters of an aqueous solution containing 50 weight percent sodium hydroxide. This solution was heated to 110° C. A solution containing 32.44 grams of reagent grade $FeCl_3 \cdot 6H_2O$ in 100 milliliters of water was gradually added to the barium chloride-sodium hydroxide solution during a 30 minute period. After the iron chloride had been added, the solution was cooled and filtered to remove a magnetic precipitate. The structure of the precipitate was predominately amorphous with a minor portion having a spinel crystalline symmetry. The filtrate contained 7.47 moles per liter sodium hydroxide.

The precipitate was air dried at 150° C and then heated to 1100° C for two hours in a muffle type furnace. After the precipitate cooled from 1100° C it was determined that a magnetic barium ferrite with a composition of $BaFe_{12}O_{19}$ and a hexagonal crystalline structure had been formed.

EXAMPLE 2

A 20.4 liter volume of a 50 weight percent sodium hydroxide solution was heated to 80° C in a 20 gallon stainless steel reactor. The reactor contained suitable means to continuously stir the solution contained therein. 499.3 grams of $BaCl_2 \cdot 2H_2O$ were added to the heated sodium hydroxide solution while agitating the solution by stirring. The resultant solution was then heated to 110° C. Without additional heating, 8726 grams of a 45.6 weight percent aqueous solution of $FeCl_3$ was diluted to 20.4 liters with water and thereafter added to the heated barium chloride-sodium hydroxide solution. The addition of the iron chloride solution was carried out, while stirring, over an approximately 25 minute time period. The temperature of the mixture initially increased to 126° C upon addition of the iron chloride solution, but cooled to and was maintained at 110° C thereafter.

A brown colored, magnetic precipitate formed in the solution after addition of the iron chloride. This precipitate was permitted to settle for two hours before the supernatant liquor, containing 7.47 moles of sodium hydroxide per liter, was removed by pumping using commercially available apparatus. The precipitate was washed to minimize impurities thereon by adding approximately 15 gallons of water thereto. The precipitate-water mixture was stirred for about 5 to 15 minutes and then permitted to settle prior to again removing the liquid portion. This washing procedure was repeated five times.

After the last washing, the magnetic precipitate-water slurry remaining was filtered using Buchner funnels and vacuum pumps. After filtering, the precipitate was air dried at 100° C for about 24 hours. The dried precipitate, now in powder form, was ground to a size of about 100 mesh (U.S. Standard Sieve Series).

The ground, predominately amorphous precipitate was heated in air to 1100° C for two hours, to form a magnetic, crystalline powder with a hexagonal symmetry. After heating at this temperature, the powder was determined by atomic absorption analysis to have a nominal composition of $Ba_{0.9}Fe_{12}O_{19}$. The magnetic powder contained predominantly the barium compound together with a minor amount of impurities as are shown in Table I.

Table I

| Impurities Present in the Hard Ferrite of Example 2 | |
|---|---|
| Impurity | Weight Percent |
| Aluminum | 0.02 |
| Calcium | 0.3 |
| Copper | 0.015 |
| Chromium | <0.01 |
| Lead | — |
| Magnesium | 0.07 |
| Manganese | 0.1 |
| Molybdenum | 0.008 |
| Nickel | 0.05 |
| Silicon | 0.02 |
| Sodium | 0.4 |
| Vanadium | <0.005 |
| Zinc | <0.5 |
| $Cl^-$ | 0.2 |

The barium ferrite powder of Example 2 was determined by standard means to have the following magnetic properties:

| | |
|---|---|
| Coercive Force | 1650 oersted |
| Energy Product | $0.9 \times 10^6$ gauss-oersted |
| Residual Induction | 2520 gauss |

To ascertain the magnetic properties of a compressed sample of the powder produced in Example 2, a quantity of the powder was cold pressed with a wax binder into 1 inch × ¼ inch discs using a pressure of 8000 pounds per square inch. The pressed discs were sintered in air at 1200° C for 90 minutes and thereafter cooled to 1000° and maintained in a flowing oxygen atmosphere for 90 minutes. The discs were then permitted to furnace cool in the oxygen enriched atmosphere. The magnetic properties of the discs were determined to be as follows:

| | |
|---|---|
| Coercive Force | 2280 oersted |
| Energy Product | $0.9 \times 10^6$ gauss-oersted |
| Residual Induction | 2600 gauss |

EXAMPLE 3

A 1000 milliliter volume of a 50 weight percent sodium hydroxide solution was heated to 80° C in a 4000 milliliter stainless steel reactor. The reactor contained means to stir a mixture contained therein during operation. 26.83 grams of $BaCl_2 \cdot 2H_2O$ were stirred into the heated sodium hydroxide solution. The resultant mixture was heated to 110° C. A quantity of 297.33 grams of $FeCl_3 \cdot 6H_2O$ was dissolved in 1000 milliliters of water and then added to the heated barium chloride-sodium hydroxide solution. The iron chloride solution was gradually stirred into the barium chloride-sodium hydroxide solution over an approximately 10 minute time period. During addition of the iron chloride solution the temperature initially increased to about 130° C and thereafter cooled to and was maintained at 110° C.

A brown colored, predominately amorphous, magnetic precipitate formed and was permitted to settle to the lower portion of the reactor. After a one hour settling time the supernatant liquid was removed by decanting. The precipitate was washed by adding approximately 2000 milliliters of clean water to the remaining precipitate-liquor sludge and stirring for about 5 to 15 minutes. After washing, the precipitate was permitted to settle and the liquid portion of the water wash removed. The washing procedure was repeated five times.

The washed, magnetic slurry was filtered using Buchner funnels and commercially available vacuum pumps. The filtered precipitate was air dried at 100° C for 24 hours. The dried, powdered precipitate was ground to a size of about 100 mesh and heated in air at 1100° C for two hours. Upon cooling from 1100° C, the magnetic powder had a crystalline structure with a hexagonal symmetry and a nominal composition of $BaFe_{12}O_{19}$. The magnetic properties of the powder at room temperature were determined by standard means to be as follows:

| | |
|---|---|
| Coercive Force | 2420 oersted |
| Energy Product | 1.0 to $1.3 \times 10^6$ gauss-oersted |
| Residual Induction | 2600 gauss |

EXAMPLE 4

A crystalline strontium ferrite is produced substantially as described in Example 3 by admixing strontium nitrate with potassium hydroxide and iron nitrate. A magnetic strontium ferrite is formed.

EXAMPLE 5

Substantially as in Example 3, a magnetic crystalline barium ferrite is formed using barium hydroxide, potassium hydroxide and iron bromide.

What is claimed is:

1. A method of forming magnetic barium and strontium ferrites comprising (a) admixing an alkaline earth metal compound selected from compounds of barium and strontium with a sufficient amount of an aqueous solution containing from about 10 to about 60 weight percent alkali metal hydroxide to form a solution; (b) heating the solution of step (a) to within the range of from about 90° to about 130° C; (c) admixing a sufficient amount of soluble iron compound with the heated solution to form a magnetic spinel precipitate which is at least partially amorphous; and (d) removing the precipitate from the mixture of step (c).

2. The method of claim 1 wherein the alkaline earth metal compound is at least one member of the group consisting of $Ba(C_2H_3O_2)_2$, $Sr(C_2H_3O_2)_2$, $Ba(NO_3)_2$, $Sr(NO_3)_2$, $BaF_2$, $SrF_2$, $BaCl_2$, $SrCl_2$, $BaBr_2$, $SrBr_2$, $BaI_2$, $SrI_2$, $Ba(OH)_2$, $Sr(OH)_2$, $BaCO_3$ and $SrCO_3$.

3. The method of claim 1 wherein the alkaline earth metal compound is least one member of the group consisting of $Ba(C_2H_3O_2)_2$, $Ba(NO_3)_2$, $BaF_2$, $BaCl_2$, $BaBr_2$, $BaI_2$, $Ba(OH)_2$ and $BaCO_3$.

4. The method of claim 1 wherein the alkaline earth metal compound is a barium chloride.

5. The method of claim 1 wherein the alkali metal hydroxide is at least one member of the group consisting of NaOH, KOH, RbOH and CsOH.

6. The method of claim 1 wherein the alkali hydroxide is sodium hydroxide.

7. The method of claim 1 wherein the iron compound is at least one member of the group consisting of $FeCl_3$, $FeBr_3$, $Fe(NO_3)_3$, $Fe_2(SO_4)_3$, $Fe(C_2H_3O_2)_2$, $Fe_2(C_2O_4)_3$ and hydrates thereof.

8. The method of claim 1 wherein the iron compound is an iron chloride.

9. The method of claim 1 wherein the alkaline earth compound is a barium chloride, the alkali hydroxide is sodium hydroxide and the iron compound is a ferric chloride.

10. The method of claim 1 including drying the precipitate of step (d) within the temperature range of from about 20° to about 200° C.

11. The method of claim 1 wherein the molar ratio of the alkali hydroxide to the iron compound is within the range of from about 0.1:1 to about 5:1.

12. The method of claim 1 wherein the heating in step (b) is carried out within the range of from about 110° to about 115° C.

13. The method of claim 1 wherein the precipitate removed in step (d) is predominantly amorphous.

14. The method of claim 1 wherein the precipitate of step (d) is a magnetic spinel consisting essentially of barium oxide, iron oxide and a minor amount of impurities.

15. A method of forming a magnetic barium-ferrite comprisng sequentially (a) admixing barium chloride with a sufficient amount of an aqueous solution containing about 10 to about 60 weight percent sodium hydroxide to produce a solution; (b) heating the barium chloride-sodium hydroxide solution to a temperature within the range of from about 90° to about 130° C; (c) admixing a sufficient amount of an aqueous ferric chloride solution with the barium chloride-sodium hydroxide solution of step (b) to provide a sodium hydroxide to ferric chloride molar ratio of from about 0.1:1 to about 5:1, and (d) removing a magnetic precipitate from the mixture of step (c); the magnetic precipitate being predominantly amorphous with a minor portion having a spinel crystalline symmetry.

16. The method of claim 15 including drying the precipitate of step (d).

17. The method of claim 15 wherein the heating in step (b) is carried out within the range of from about 110° to about 115° C.

* * * * *